Nov. 24, 1970        J. H. ENICKS        3,541,639

APPARATUS FOR MAKING AN ATHLETIC MAT MEMBER

Filed Jan. 23, 1967        3 Sheets-Sheet 1

INVENTOR.
JAMES H. ENICKS
BY

Nov. 24, 1970    J. H. ENICKS    3,541,639
APPARATUS FOR MAKING AN ATHLETIC MAT MEMBER
Filed Jan. 23, 1967    3 Sheets-Sheet 2

INVENTOR.
JAMES H. ENICKS
BY
Melvin A. Gively

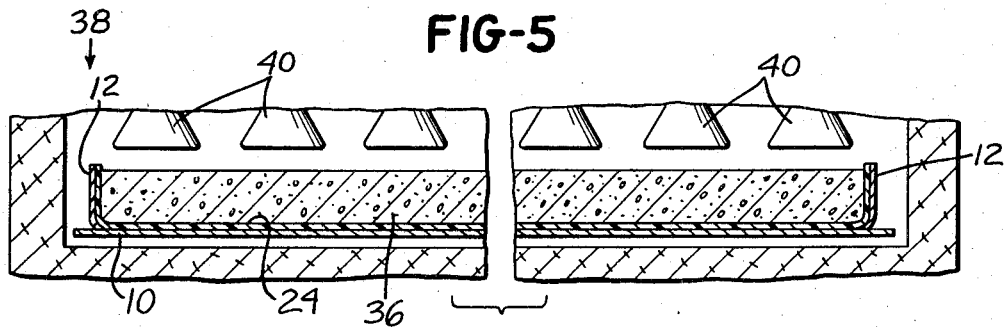
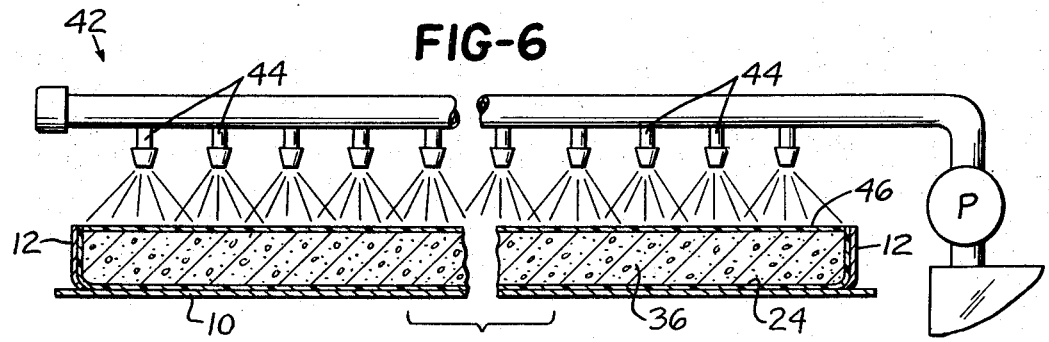
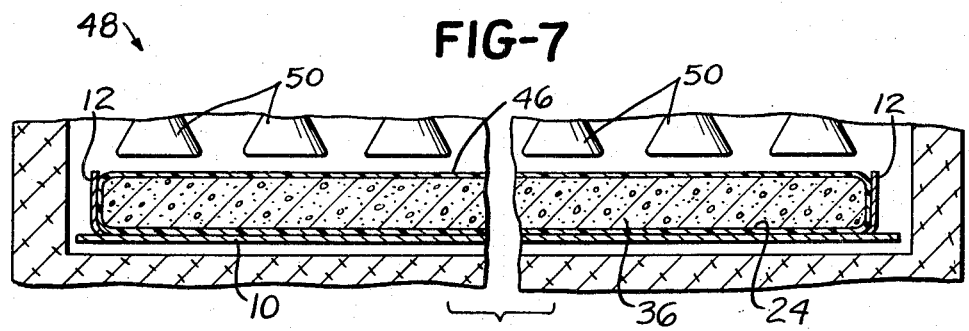

United States Patent Office

3,541,639
Patented Nov. 24, 1970

3,541,639
APPARATUS FOR MAKING AN ATHLETIC MAT MEMBER
James H. Enicks, Greenville, Ohio, assignor to Enroc Laboratories Development Co., Greenville, Ohio
Filed Jan. 23, 1967, Ser. No. 611,155
Int. Cl. B29d 27/00
U.S. Cl. 18—4                    4 Claims

ABSTRACT OF THE DISCLOSURE

The invention concerns large athletic mats or pads consisting of a foamed body of plastic material and an unfoamed skin of the same material covering the body and to a belt type apparatus for making the material in long lengths by first spraying the material of the pad without a foaming agent on the belt, then applying material with a foaming agent to the sprayed on skin material, then spraying on further material without a foaming agent to form a top skin and curing the assembly, utilizing intermediate curing steps to set up the first skin and the body.

---

This invention relates to an apparatus for making large foamed articles continuously.

In my co-pending application Ser. No. 422,788, I have disclosed pad members for athletic use particularly characterized in that there is provided a body of foamed elastomeric material having thereon an integral skin of the same material thereon but with the skin being unfoamed.

It has been discovered that by making the skin of such a member integral with the foamed body, a much better member is produced because skin does not tend to separate from the body but remains integrally connected therewith at all times. The skin provides a smooth surface for the body and is also fluid impervious and thus seals the body against picking up fluid such as moisture and particles of dirt.

In my co-pending application referred to above, I have shown how a relatively small pad such as might be employed by football players and the like can be manufactured and shaped to the contour of the body. The present invention is concerned with the provision of a member having the characteristics of a foamed body with an integral skin thereon but wherein the member manufactured is of large size and can be produced continuously in long lengths.

The members manufactured according to the present invention are particularly adapted for use as mats and the like such as wrestling mats, or mats for tumblers and in other locations, and to a method and apparatus which permits the manufacture of large members of this nature in substantially continuous lengths by a continuous process which is economical and efficient.

With the foregoing in mind, it will be evident that a primary object of the present invention is the provision of an apparatus for making large foamed members having integral skins thereon.

Another object of this invention is to provide an apparatus for making foamed members with integral skins thereon in continuous lengths.

A still further object is the process of an apparatus for making foamed articles with integral skins thereon in continuous lengths and performing the operation as a continuous process rapidly and efficiently.

The exact nature of the present invention will be more clearly understood upon reference to the following detailed specification taken in connection with the accompanying drawings in which:

FIG. 5 is a section taken on line V—V of FIG. 1 showing a second partial curing step according to the present invention;

FIG. 6 is a sectional view taken on line VI—VI of FIG. 1 showing still another step in the process;

FIG. 7 is a sectional view taken on line VII—VII of FIG. 1 showing a final curing step according to the present invention; and FIG. 8 is a view drawn at somewhat enlarged scale and in the form of a fragmentary sectional view showing more in detail the work member made in the apparatus according to the present invention and by the process according to the present invention.

Figure 1:
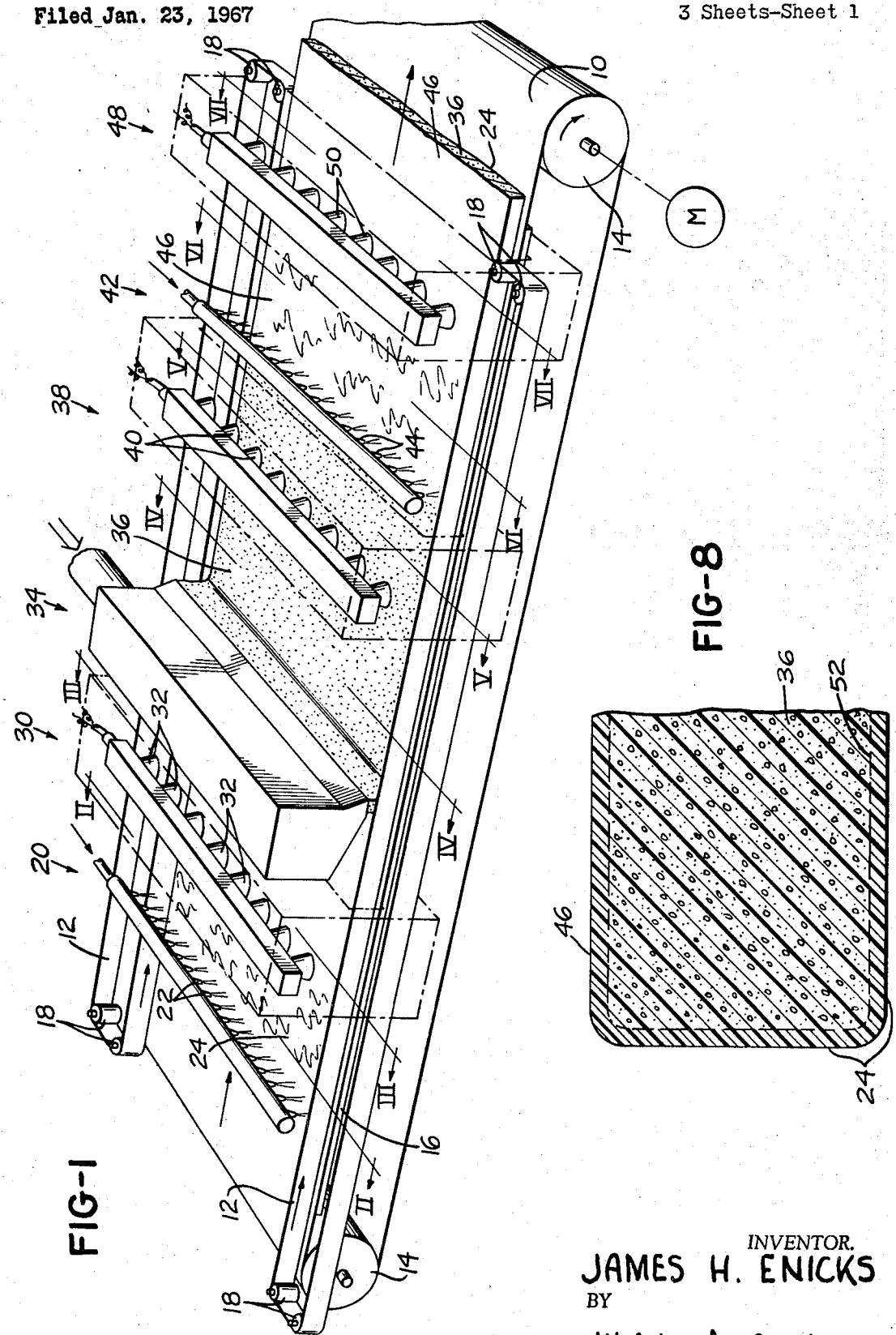
FIG. 1 is a schematic perspective view showing the entire installation and all of the basic steps in connection with the apparatus and process according to the present invention.

Referring to the drawings somewhat more in detail, in FIG. 1 there is shown a long conveyor belt 10 which may, advantageously, be of stainless steel but which can also be of other materials from which the plastic elastomeric material making up the work member can be stripped. At each side of conveyor belt 10 are vertical belts 12 which form sort of deckle straps to confine the member with respect to the width thereof. Rollers 14 at opposite ends of conveyor belt 10 provide support therefor and are driven to drive the belt in the direction of its length. Further supporting means such as the table 16 support at least the upper reach of belt 10 so that it moves in a horizontal direction at all times. Rollers 18 support the vertical edge belts 12 and are driven to cause the belts 12 to move at the same speed as the belt 10.

Figure 2:
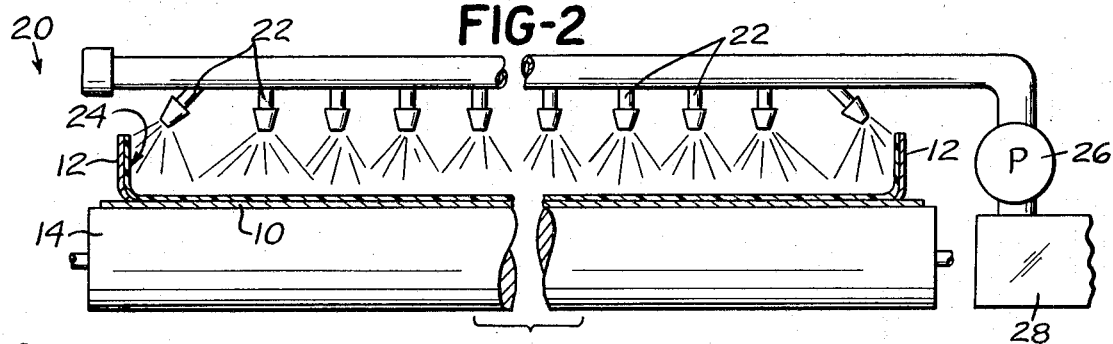
FIG. 2 is a transverse section taken on line II—II of FIG. 1 showing a step in the process.

The belts 10 and 12, in carrying out the process are advanced through a first station, indicated generally at 20 in FIG. 1 and shown in more detail in FIG. 2 and wherein a plurality of spray heads 22 are provided which spray a skin 24 of the elastomeric material on top of belt 10 and on the insides of the belts 12 to form a continuous unbroken coating thereon.

Figure 3:
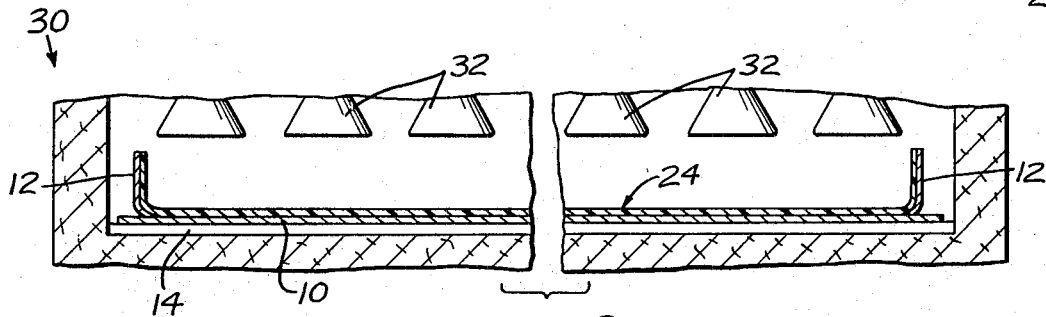
FIG. 3 is a transverse section taken on line III—III of FIG. 1 showing another step forming a part of the process of the present invention.

The material is supplied to spray nozzles 22 by pump 26 which draws the material from a source 28 thereof. This skin is relatively thin, say from one-sixteenth to one-eighth of an inch thick and is in a somewhat semi-liquid condition when sprayed in place. The belts at the time of spraying can be heated to effect quick setting up of the material before it flows away from its deposited position but, in any case, immediately after the spraying step, the belts 10 pass through a second station, indicated generally at 30 in FIG. 1 and shown more in detail in FIG. 3. In station 30 heating means, which may be in the form of infra-red lamps 32, are provided which heat the skin 24 and effect at least partial curing thereof to the extent that the skin is self-supporting.

Figure 4:
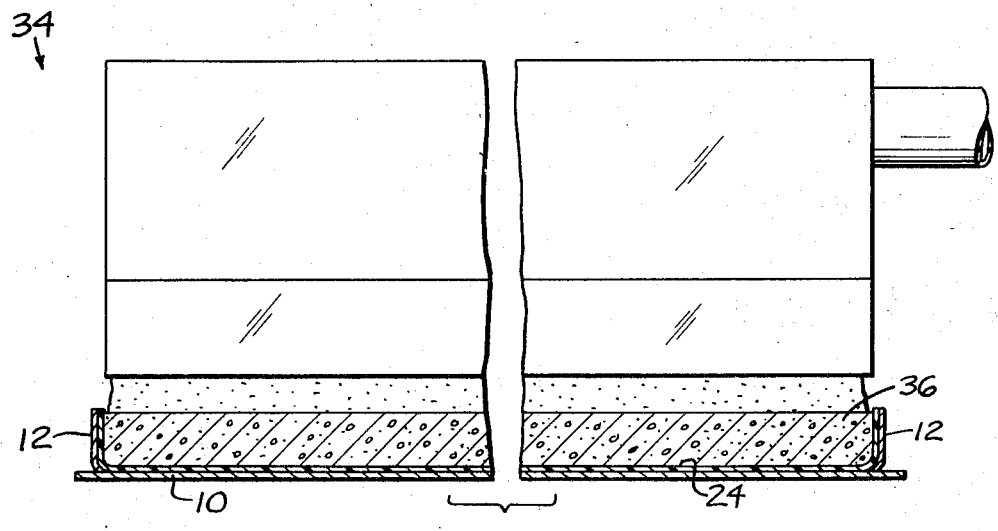
FIG. 4 is a section taken on line IV—IV of FIG. 1 showing a still further step in the process.

From station 30 the belts move into a station 34, shown in FIG. 4 and wherein a body 36 of material is placed in the now partial set up skin 24. Material 36 is the same material as makes up the skin 24 except that the body of material in 36 contains a foaming agent and is deposited in measured amount on skin 24.

Following this depositing of the body of material 36 the belts move into a station 38, shown in FIG. 5 and wherein at least body 36 is heated, for example, by infrared lamps 40. This additional heating causing foaming of the body 36 and setting up thereof to the extent it also is self-supporting.

Following station 38 the belts move into a station 42, shown in FIG. 6 and wherein another set of spray nozzles 44 spray a top skin 46 on the assembly consisting of foamed body 36 and skin 24. Skin 46 extends completely to the sides of body 36 and joins with skin 24 so that the body 36 is now provided with a complete unbroken integral skin member extending completely thereabout.

From station 42 the belts now move to a station 48, shown in FIG. 7 and wherein the entire work member is again heated by heating means 50, which may again comprise infra-red lamps, and the entire member is completely cured. The now cured member can be stripped from belt 10 and either wound up or severed into suitable lengths. The member can be made as long or as wide as desired and is characterized, as mentioned before, in the integral unbroken skin extending completely thereabout.

Reference to FIG. 8 will show that the foamed body 36 is completely surrounded by the skin made up of portions 24 and 46 which are so united to form a single unbroken skin about the body and which, is indicated by the broken line 52 is integrally joined to the body by being directly fused thereto and forming a continuation of the material of the body. The skin is thus extremely intimately connected with the body and will not tear therefrom or separate therefrom through deterioration of any adhesive connection because absolutely no adhesive is employed in joining the skin to the body.

The member according to the present invention is particularly useful for athletic mats and articles of that nature where a large resilient body is to be employed. The member can be made relatively thin to provide for a small amount of resilience and which case it might be used as padding which is walked upon, or it may be made relatively thick and have a high degree of resilience in which case it could be used as a wrestlers mat or the like where the greater degree of resilience is required.

In any case, the member is relatively inexpensive to make and large pads can be made up with relatively few if any joints therein and the member is easy to keep clean and will not deteriorate from the absorption of moisture or become unuseable because of dirt imbedded therein.

The materials used for the pads are plastisols which are dispersions of polyvinyl chloride resins in suitable liquid plasticizers for instance, phthalate, which normally are used to form solid plastic toys, for example. A suitable blowing agent is added to form the plastisol solids into an extremely tough foam which will absorb a very high degree of shock. The plastisol foam is chemically resistant to most acids, alkalies, detergents, oils, and some solvents. The amount of blowing agent used will be varied to give the size and number of cells desired in the foam.

It will be understood that this invention is susceptible to modifications in order to adapt it to different usages and conditions; and accordingly, it is desired to comprehend such modifications within this invention as may fall within the scope of the appended claims.

What is claimed is:

1. An apparatus for producing lengths of rubber-like material consisting of a foamed body and an unfoamed skin integral with the body and completely surrounding the body when the body is viewed in transverse cross section, said apparatus comprising: horizontal belt means, vertical belt means at the sides of said horizontal belt means, a plurality of stations distributed along said belt means and means for moving said belt means through said stations, means in a first station along said belt means for spraying a first layer of liquid rubber-like material free of foaming agent on said belt means which is continuous across the width of said horizontal belt means and the sides of said vertical belt means which face each other, means in a second station along said belt means spaced from said first station for supplying heat for partially curing said first layer, means in a third station along said belt means spaced from said second station for depositing a second layer of identical rubber-like material not more liquid than semi-liquid and with a foaming agent therein in the trough defined by said first layer, means in a fourth station along said belt means spaced from said third station for supplying heat for foaming said second layer, means in a fifth station along said belt means spaced from said fourth station for spraying a third layer of the same said liquid rubber-like material free of foaming agent on said second layer so as to extend completely across said second layer and so that the side edges of said third layer join with the edges of said first layer near the tops of the portions of said first layer on said vertical belt means whereby said first and third layers form a continuous skin about said second layer and integral therewith, and means in a sixth station along said belt means spaced from said fifth station for supplying heat for curing said assembly of first, second and third layers while the said assembly is still on said horizontal belt means.

2. An apparatus according to claim 1, in which said means for curing and foaming comprise heating tunnels through which said belt means passes.

3. An apparatus according to claim 2, in which said means for spraying said liquid material comprises nozzles distributed laterally of said horizontal belt means, and the nozzles in said first station including nozzles disposed to spray a layer of the liquid on said vertical belt means.

4. An apparatus according to claim 3, in which said belt means is formed of stainless steel.

References Cited

UNITED STATES PATENTS

| 2,441,235 | 5/1948 | Blair et al. |
| 2,688,152 | 9/1954 | Marco. |
| 2,923,029 | 2/1960 | Harris et al. |
| 3,067,455 | 12/1962 | Reid. |
| 3,099,518 | 7/1963 | Wetzles. |
| 3,171,872 | 2/1965 | Jarrett et al. |
| 3,310,616 | 3/1967 | Beary. |
| 3,325,823 | 6/1967 | Boon. |

FOREIGN PATENTS 1,147,027  4/1963  Germany.

WILBUR L. McBAY, Primary Examiner

U.S. Cl. X.R.

18—5